United States Patent [19]

Tick et al.

[11] 3,746,864

[45] July 17, 1973

[54] DEVICE FOR SENSING AND CONTROLLING OPTICAL DENSITY

[75] Inventors: Sanford J. Tick, Millington, N.J.; Gunter Zweig, Syracuse; William L. Emeny, Jr., Fabius, both of N.Y.

[73] Assignee: New Brunswick Scientific Co., Inc., New Brunswick, N.J.

[22] Filed: Jan. 3, 1972

[21] Appl. No.: 214,901

[52] U.S. Cl............... 250/218, 250/220 C, 356/206
[51] Int. Cl.... G01n 21/22, G01n 21/26, H01j 39/12
[58] Field of Search.................... 250/218; 356/206; 250/220 C

[56] References Cited
UNITED STATES PATENTS

| | | | |
|---|---|---|---|
| 2,501,599 | 3/1950 | Eltenton et al. | 356/206 |
| 3,437,822 | 4/1969 | Fitzsimmons | 250/218 X |

*Primary Examiner*—James W. Lawrence
*Assistant Examiner*—T. N. Grigsby
*Attorney*—Alex Friedman, Harold I. Kaplan et al.

[57] ABSTRACT

A device for sensing and controlling optical density of a fluid. The device includes a pair of tube portions of different cross-sectional areas through which the fluid flows, these tube portions having walls which are transparent and which are of equal optical characteristics. A light source is provided on one side of the tube portions for directing light transversely through the fluid which flows through the tube portions, and on the other side of the tube portions there are a pair of photocells which respetively receive the light, so that one of the photocells receives light which travels through the tube portion of larger cross-sectional area with a longer path of travel through the fluid than the light received by the other of the photocells. As the optical density of the fluid increases the differential in the light received by the photocells will also increase, and this differential can be detected for achieving desired controls. The light which reaches the photocell receiving the light which has travelled through the tube portion of smaller cross-sectional area is maintained at a constant intensity by an adjacent third photocell.

8 Claims, 4 Drawing Figures

Patented July 17, 1973 3,746,864
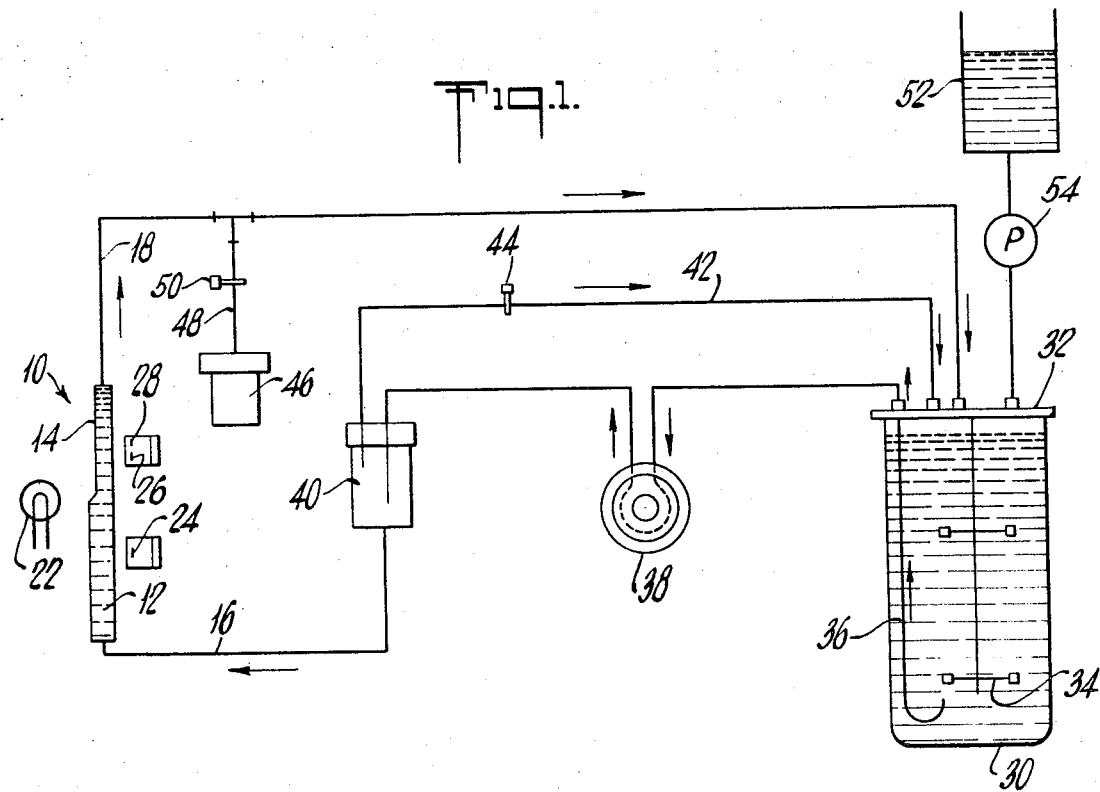
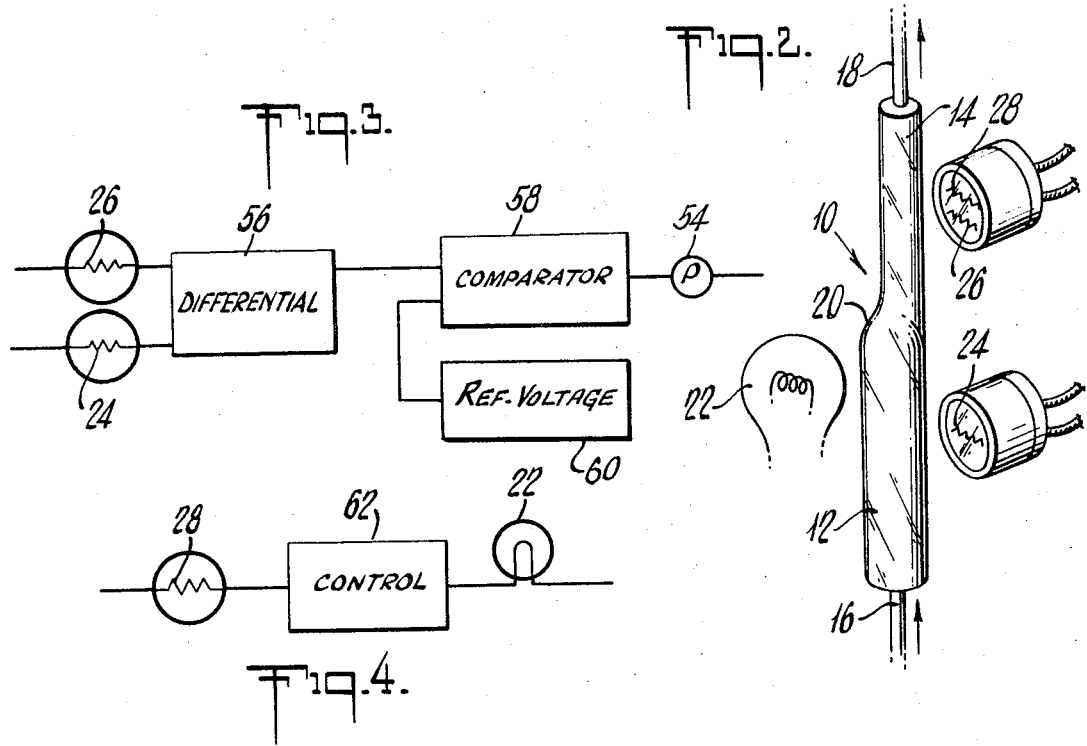

DEVICE FOR SENSING AND CONTROLLING OPTICAL DENSITY

BACKGROUND OF THE INVENTION

The present invention relates to devices for sensing and controlling optical density.

Such devices have many different fields of use. For example, when bacterial growth takes place in a liquid medium, the density of the liquid is measured so that diluent can be added as required. There are a wide variety of bacterial cultures which can be properly controlled by monitoring the turbidity or optical density in a continuous manner. Devices for measuring optical density may be used, for example, in connection with fermentors where the cell density in the liquid must be measured in order to achieve a proper control.

Although there are known devices for this purpose, the known devices suffer from various drawbacks. Thus, for example, it is difficult to separate from the measurement the effects of bubbles in the liquid, and these bubbles will undesirably influence the accuracy of the measurement. Also, there are no known devices for measuring optical density in such a way that the devices will operate for a long period of time as well as over a wide range of optical densities either with batch or continuous bacterial cultures. The result is that with previously known devices it is essential to take samples at frequent intervals and check on these samples, so that a considerable amount of time, inconvenience and costs are involved with conventional structures.

A further problem encountered is that the microbial cells undesirably affect turbidity measurements by clinging to the walls of the known devices, and greatly reduce the effectiveness thereof.

SUMMARY OF THE INVENTION

It is accordingly a primary object of the present invention to provide a device, for sensing and controlling optical density, which will avoid the above drawbacks.

In particular, it is an object of the present invention to provide a device of this type which is capable of operating continuously over a long period of time giving the possibility of readings whenever desired or the possibility of recording the change in turbidity or optical density so that the recorded information can be consulted whenever desired.

Also, it is an object of the present invention to provide a device of this type which will greatly reduce the possibility of clinging of microbial cells to the walls of the sensing device, so that deposits on the walls will be reduced to a minimum, thus enhancing the possibility of continuous operation over a long period of time.

Yet another object of the present invention is to provide not only a device for measuring optical density with a high degree of accuracy and in a relatively simple highly effective manner, but also a device which will avoid such problems as the presence of bubbles in a liquid, voltage fluctuations which might undesirably introduce inaccuracies, uncontrollable increase or decrease in the light which issues from a light source, and the like.

In addition, it is an object of the present invention to provide a device of the above type which lends itself to use effectively with a system of automatic controls according to which the condition of a liquid such as the liquid in a fermentor may be maintained automatically within a given range of optical density, as desired.

According to the invention the device for measuring optical density includes a pair of tube portions which are situated in series one after the other, these tube portions having transparent walls of the same optical characteristics. One of the tube portions has a cross-sectional area greater than the other. A means communicates with the tube portions for directing therethrough the fluid whose optical density is to be measured. A light source means is provided for directing light through these tube portions, so that the light which travels through the tube portion of larger cross-sectional area has a longer path of flow transversely through the fluid than the light which travels through the tube portion of smaller cross-sectional area. A pair of photosensitive means are respectively situated with respect to the tube portions so as to receive the light which has passed transversely therethrough, and as the density of the fluid increases the differential in the light received by the pair of photosensitive means will also increase, the pair of photosensitive means converting the light intensity which is detected thereby into a pair of signals which enable the differential to be detected and to be used as a control signal. A third photosensitive means is located at the side of the tube portion of smaller cross-section opposite from the light source to receive the light therefrom, and this third photosensitive means functions to maintain at a constant intensity the light which is received by the photocell at the side of the tube portion of small cross-section opposite from the light source means. Thus, by maintaining a constant light intensity for the photosensitive means which measures the turbidity of the fluid flowing through the tube portion of smaller cross-section, the accuracy of the measurement of the differential is enhanced.

BRIEF DESCRIPTION OF DRAWINGS

The invention is illustrated by way of example in the accompanying drawings which form part of this application in which:

FIG. 1 is a schematic representation of a device according to the invention in association with a fermentor and controls for the latter;

FIG. 2 is a fragmentary perspective illustration showing further details of the device of the invention;

FIG. 3 is a schematic block diagram of the electrical structure used with the invention; and FIG. 4 is a schematic block diagram of the structure for maintaining the constant light intensity.

DESCRIPTION OF PREFERRED EMBODIMENTS

Referring now to the drawings, FIG. 2 shows a device 10 according to the present invention for measuring the optical density of a fluid. This device 10 includes a pair of tube portions 12 and 14. These tube portions are transparent and may be made of any suitable glass or plastic. Thus the tube portions may be made of clear glass. The optical characteristics of the walls of the tube portions 12 and 14 are identical.

It will be noted that the tube portions 12 and 14 are connected in series so that fluid flowing through the tube portions must first flow through one of the tube portions and then through the other of the tube portions. In the illustrated example a means communicates with the tube portions 12 and 14 for directing the fluid first through the tube portion 12 and then through the tube portion 14. This means includes the supply conduit 16 which feeds the fluid into the lower end of the tube portion 12, as viewed in FIG. 2, and a discharge conduit 18 which receives the fluid from the upper tube portion 14.

It is preferred to arrange the tube portions 12 and 14 one directly next to the other with these tube portions being united into a single unitary one-piece structure so that these tube portions are interconnected by the tapered transition region 20 illustrated in FIG. 2.

The diameters of the tube portions 12 and 14 are selected so as to be small enough to provide for a rapid flow of the fluid through the tube portions. Thus, in one specific example of the invention which has been constructed and operated, the tube portion 12 had an outer diameter of 6mm, while the tube portion 14 had an outer diameter of 5mm, and the wall thickness of both tube portions was 1mm. The volumetric flow rate of a pump which together with the conduits 16 and 18 forms a means for directing the fluid through the tubes was such that within the tube portions 12 and 14 the rate of flow of the fluid was 0.9 ft/sec. and 1.2 ft/sec.

It has been found that this relatively rapid rate of flow greatly inhibits the possibility of deposits clinging to the inner surfaces of the tube portions.

A light source means 22 is provided for directing the light transversely through the tube portions. This light source means 22 may take the form of any incandescent bulb, for example. Thus, the light from the light source means will travel transversely through the tube portions, and of course at the tube portion 12 the light will have a longer path of travel through the fluid than at the tube portion 14.

At the side of the tube portions opposite from the light source means 22 are a pair of photosensitive means 24 and 26 in the form of suitable photocells, for example, which receive the light and respond to the intensity thereof for creating corresponding electrical signals, as is well known. Thus, since the condition of the tube walls will remain constant, the differential between the signals derived from the pair of photosensitive means 24 and 26 will be an indication of the optical density of the fluid, and of course this differential will increase as the optical density increases, thus giving an accurate measure of the optical density.

According to a further feature of the invention, a third photosensitive means 28, also in the form of a photocell, is situated adjacent the element 26 for receiving light which travels through the smaller tube portion 14. This photosensitive means 28 forms part of a regulating means for regulating light source means 22 as required in order to maintain the intensity of the light which is received by the photosensitive means 26 constant. Therefore as a result of this feature the measurement of the differential has an increased accuracy.

The manner in which the device of FIG. 2 may be used is illustrated in FIG. 1. Thus, it will be seen from FIG. 1 that a suitable liquid whose optical density is to be measured is situated within a fermentor 30. This fermentor 30 has a cover 32 and in its interior there is a stirrer 34. Through a tube 36, the liquid is drawn from the vessel 30 by a pump 38 which may be a peristaltic pump. The pump 38 delivers the liquid into a debubbler or degasser 40, and the gas separated from the liquid in this unit returns to the vessel 30 through a conduit 42 held in position by any suitable clamp 44, for example. From the unit 40 the liquid, free of bubbles and gas, is received by the conduit 16 so as to be delivered to the tube portion 12 of the device 10 of the invention, and after flowing through the device of the invention the liquid is received by the conduit 18 which communicates with a suitable sampler unit 46 which may be operated from time to time to take samples as desired. The liquid is delivered from the conduit 18 back into the interior of the vessel 30.

The sampler 46 communicates with the tube 18 through a suitable tube 48 held in position by any suitable clamp 50 or the like.

Over the vessel 30 is a vessel 52 containing a diluent, and the flow of diluent back into the vessel 30 is controlled by a pump 54 which may be automatically regulated in accordance with the optical density measurements made with the device of the invention. Thus, when it is detected that the optical density has increased to a given value, the pump 54 will be automatically actuated in order to deliver additional diluent to the vessel 30, and this vessel 30 communicates with a known device for maintaining the level of the liquid in the vessel 30 constant.

As may be seen from FIG. 3, the pair of photosensitive means 24 and 26 are electrically connected with electrical structure 56 which may be any known bridge circuit or the like for detecting the differential between the electrical signals. The output from the unit 56 is delivered to a comparator circuit 58 of any known construction which receives not only the output from the differential unit 56 but also a reference signal provided in any suitable way as by a reference voltage source 60. When the comparator detects a predetermined differential it will provide an output to the pump 54 in order to actuate the latter.

FIG. 4 schematically illustrates how the photosensitive means 28 is connected through electrical structure 62 for controlling the light source means 22 so as to maintain a constant intensity in the light received by the photosensitive means 26. These controls 62 are well known in the art, as is the case with the details of the units 56 and 58, and the detailed electrical structure of these units forms no part of the present invention.

It has been found that the device 10 of the invention can operate for extensive periods without requiring cleaning of the tube portions 12 and 14. Even if there are some slight deposits on the walls of these tube portions, these deposits are so uniformly distributed along these walls that the walls maintain their equal optical characteristics. However, a deposition on these walls is minimal for long periods of time because of the rapidity with which the fluid travels through the tube portions. Uniform coating on the walls of both tube portions will reduce the transmission of light. This would result in a higher optical density reading. However, since the light on cell 28 will also be reduced, it will increase the light output of lamp 22 and thus compensate for the wall deposition.

The uniting of the photocells 26 and 28 into a single unit provides a compact structure, and such units are available on the market as well as units which include a single photocell such as the photocell 24.

Thus, with the device of the invention an exceedingly accurate measurement of optical density is achieved, and this measurement may be recorded and monitored over a long period of time in a fully continuous manner.

Debubbler 40 helps to eliminate bubbles in the tube portions. Random bubbles and coating on the tube portions are compensated out by the arrangement. In effect, small foreign material is compensated for since it affects the spaced reading positions in like manner.

What is claimed is:

1. In a device for sensing and controlling the optical density of a fluid, a pair of tube portions which have transparent tube walls of equal optical characteristics, said tube portions being arranged in series one after the other and one of said tube portions having a cross-sectional area greater than the other, means communicating with said tube portions for directing therethrough a fluid the optical density of which is to be measured, so that the fluid flows first through one of the tube portions and then through the other of the tube portions, light source means situated adjacent said tube portions for directing light transversely therethrough, so that the light which travels through the tube portions of larger cross-sectional area has a longer path of travel through the fluid than the light which travels through the tube portion which has the smaller cross-sectional area, a pair of photosensitive means respectively situated adjacent said tube portions at a side thereof opposite from said light source means for respectively receiving light travelling through said tube portions, said pair of photosensitive means respectively responding to light received thereby for converting the light into electrical signals the magnitude of which corresponds to the optical density of the fluid, and means electrically connected with a said pair of photosensitive means for detecting the differential between said signals, whereby as the optical density of the fluid increases said differential will also increase, and a regulating means operatively connected with said light source means for regulating the latter as required to maintain a constant intensity in the light which is received by that one of the photosensitive means which receives light which has travelled through the tube portion of smaller cross-sectional area.

2. The combination of claim 1 and wherein said tube portions have cross-sectional areas which are small enough to provide for the fluid flowing therethrough a speed of flow which is great enough to retard formation of deposits on the interior surfaces of the tubes.

3. The combination of claim 1 and wherein said means which communicates with said tube portions for directing the fluid therethrough directs the fluid first through the tube portion of larger cross-sectional area and then through the tube portion of smaller cross-sectional area.

4. The combination of claim 1 and wherein said tube portions are integrally fixed one to the other and form a unitary, one-piece assembly.

5. The combination of claim 1 and wherein said regulating means includes a third photosensitive means situated adjacent said one photosensitive means, which receives light which has travelled through the tube portion of smaller cross-sectional area, for also receiving the latter light and for responding thereto in order to provide a signal used for regulating said light source means.

6. The combination of claim 5 and wherein said light source means is in the form of a single light source situated on one side of both of said tube portions while all of said photosensitive means are situated on the other side of both of said tube portions.

7. The combination of claim 6 and wherein all of said photosensitive means are in the form of photocells.

8. The combination of claim 7 and wherein said third photosensitive means and said one photosensitive means, which receives light which travels through the tube portion of smaller cross-sectional area, are combined into a single photocell unit.

* * * * *